United States Patent
Sturm et al.

(10) Patent No.: US 9,667,115 B2
(45) Date of Patent: May 30, 2017

(54) ELECTRONIC HOUSING FOR AN ELECTRIC MOTOR WITH PROTECTION AGAINST ACCIDENTAL CONTACT

(71) Applicant: ebm-papst Mulfingen GmbH & Co. KG, Mulfingen (DE)

(72) Inventors: Michael Sturm, Bad Mergentheim-Rot (DE); Thomas Sauer, Bad Mergentheim (DE); Matthias Maschke, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 369 days.

(21) Appl. No.: 14/405,646

(22) PCT Filed: May 13, 2013

(86) PCT No.: PCT/EP2013/059830
§ 371 (c)(1),
(2) Date: Dec. 4, 2014

(87) PCT Pub. No.: WO2014/012691
PCT Pub. Date: Jan. 23, 2014

(65) Prior Publication Data
US 2015/0145382 A1    May 28, 2015

(30) Foreign Application Priority Data
Jul. 20, 2012  (DE) ......................... 10 2012 106 605

(51) Int. Cl.
*H02K 11/00*    (2016.01)
*H02K 5/10*    (2006.01)
(Continued)

(52) U.S. Cl.
CPC ............. *H02K 5/10* (2013.01); *F04D 25/068* (2013.01); *H02K 9/06* (2013.01); *H02K 9/08* (2013.01);
(Continued)

(58) Field of Classification Search
CPC  H02K 5/225; H02K 5/04; H02K 5/08; H02K 5/02; H02K 2203/03; H02K 2211/03
(Continued)

(56) References Cited

U.S. PATENT DOCUMENTS

| | | | |
|---|---|---|---|
| 5,793,132 A * | 8/1998 | Hirose | ................. B60K 7/0007 310/67 R |
| 6,753,629 B2 * | 6/2004 | Doi | ........................ H02K 5/161 310/156.05 |

(Continued)

FOREIGN PATENT DOCUMENTS

| | | |
|---|---|---|
| DE | 10313273 A1 | 10/2004 |
| EP | 1361644 A2 | 11/2003 |
| JP | 2001128407 A | 5/2001 |

OTHER PUBLICATIONS

International Search Report (in German with English Translation) for PCT/EP2013/059830, mailed Jul. 9, 2013; ISA/EP.

*Primary Examiner* — Thanh Lam
(74) *Attorney, Agent, or Firm* — Harness, Dickey & Pierce, P.L.C.

(57) ABSTRACT

The present invention concerns an electronic housing for an electric motor, consisting of a housing holder part with a housing floor and a housing wall comprising the housing floor. A housing opening lies opposite the housing floor. Arranged in the housing holder part is a motor electronic component with an electronic printed circuit board, which is arranged parallel to the opening plane of the housing opening. Detachably arranged on the electronic printed circuit board or on the motor electronic component, on a side of the electronic printed circuit board facing away from the hous-
(Continued)

ing floor is a contact protecting component, which covers this surface, from an electrically insulating material, which has at least partially a grid structure as an air outlet.

11 Claims, 7 Drawing Sheets

(51) Int. Cl.
    *H02K 9/06* (2006.01)
    *F04D 25/06* (2006.01)
    *H02K 9/08* (2006.01)
    *H02K 11/33* (2016.01)
(52) U.S. Cl.
    CPC ......... *H02K 11/33* (2016.01); *H02K 2205/09* (2013.01); *H02K 2211/03* (2013.01)
(58) Field of Classification Search
    USPC ....................................................... 310/71, 89
    See application file for complete search history.

(56) References Cited

U.S. PATENT DOCUMENTS

| | | | |
|---|---|---|---|
| 7,211,914 B2* | 5/2007 | Hofmann | H02K 5/10 310/68 R |
| 2004/0108779 A1* | 6/2004 | Boettger | H02K 5/08 310/89 |
| 2004/0232786 A1* | 11/2004 | Fukazawa | H02K 1/276 310/89 |
| 2007/0001535 A1* | 1/2007 | Mori | H01R 39/385 310/239 |
| 2009/0079281 A1* | 3/2009 | Best | H02K 11/33 310/71 |
| 2014/0054991 A1* | 2/2014 | Hyodo | F04C 2/18 310/71 |
| 2014/0265671 A1* | 9/2014 | Bradfield | H02K 5/225 310/71 |

* cited by examiner

ELECTRONIC HOUSING FOR AN ELECTRIC MOTOR WITH PROTECTION AGAINST ACCIDENTAL CONTACT

CROSS REFERENCE TO RELATED APPLICATIONS

This application is a U.S. National Phase Application under 35 U.S.C. 371 of International Application No. PCT/EP2013/059830 filed on May 13, 2013 and published in German as WO 2014/012691 A1 on Jan. 23, 2014. This application is based on and claims the benefit of priority from German Patent Application No. 10 2012 106 605.1 filed Jul. 20, 2012. The entire disclosures of all of the above applications are incorporated herein by reference.

The present invention relates to an electronics housing for an electric motor, consisting of a housing receiving part comprising a housing floor, a housing wall incorporating the housing floor, and comprising a housing opening opposite the housing floor, a motor electronics component being arranged in the housing receiving part, comprising an electronic printed circuit board extending parallel to the opening plane of the housing opening.

It is known, for example, to fully cast electronic printed circuit boards of this type of electronics housing with a casting compound for protection from external influences. This is a very expensive process. This casting protects the electronic printed circuit board from contact, dirt and other external influences, particularly when the electronics housing is removed for repair of the electric motor. The casting of the electronic printed circuit board is also used to prevent electrostatic discharge.

Proceeding from an electronics housing of the type described at the outset, the object of the present invention is to improve said electronics housing so as to protect the electronic printed circuit board from contact in a structurally simple and cost-effective manner.

According to the invention this is achieved in that a contact-protection component made of an electrically insulating material and covering the printed circuit board is removably arranged on the electronic printed circuit board or on the motor electronics component on the side of the printed circuit board facing away from the housing floor, at least part of which contact-protection component has a grille structure as ventilation. Expediently, the contact-protection component is formed as a cover plate which covers the housing opening and thus the electronic printed circuit board beneath it and, owing to the presence of the grille structure, prevents direct contact of the electronic printed circuit board during installation and removal. Advantageously, the contact-protection component according to the invention is formed so as to have a recess for receiving a fan wheel of an internal fan of the motor to be installed. This recess is shaped such that the airflow produced by the fan wheel is able to flow radially through openings in the contact-protection component and to flow back through the central opening in the contact-protection component to the fan.

Further advantageous embodiments of the invention are found in the dependent claims and the invention will be described in more detail on the basis of the embodiments shown in the accompanying drawings, in which:

Figure 1:
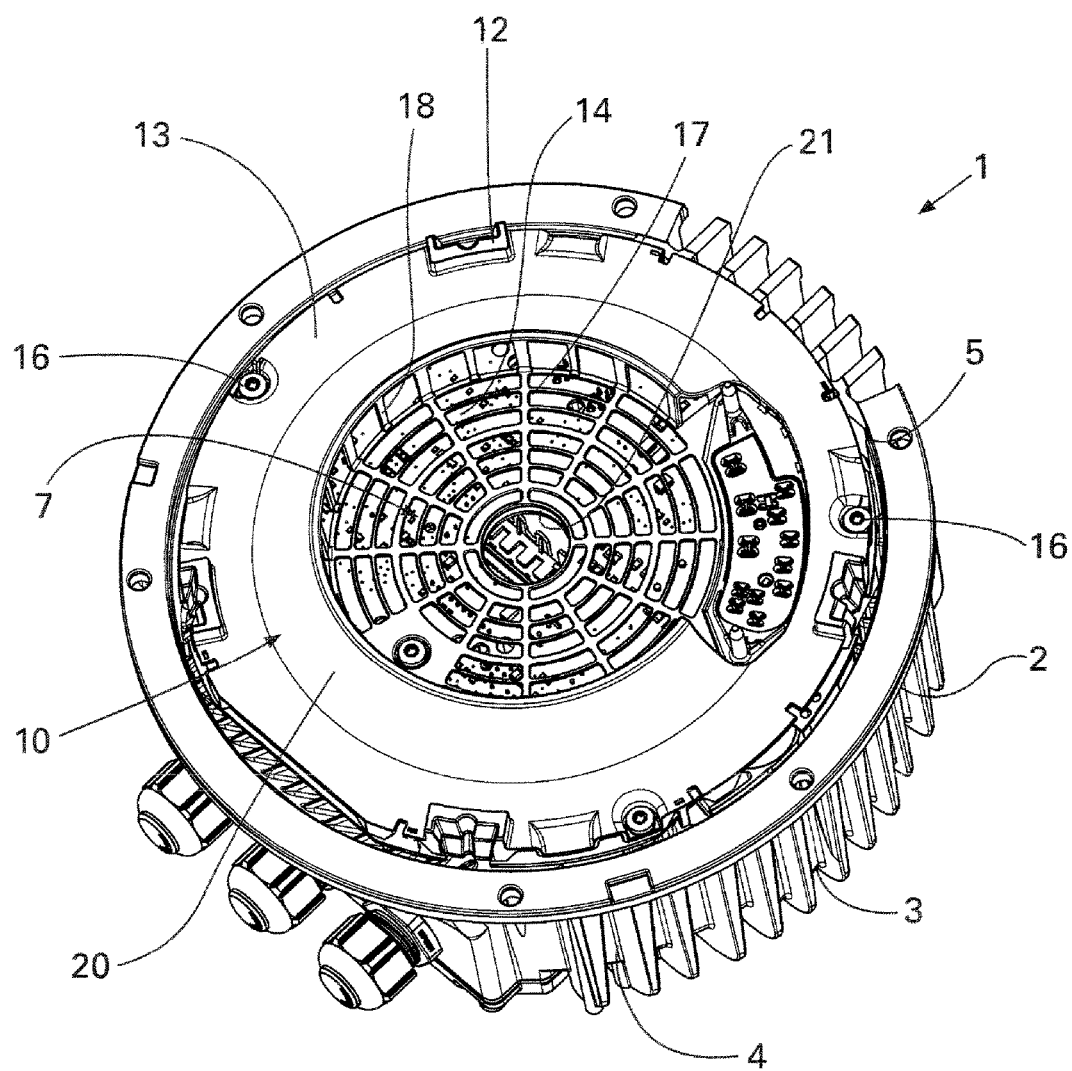
FIG. 1 is a view of an electronics housing according to the invention.

In FIGS. 1 to 7, like parts or parts having the same function are identified with the same reference numerals. Where certain features of the electronics housing according to the invention or of the contact-protection cover plate according to the invention or features of the components thereof which are described and/or can be inferred from the drawings are described in relation to just one embodiment of the invention, these are, according to the invention, nevertheless essential as individual features or else in combination with other features of the embodiment and are claimed as belonging to the invention, independently of this embodiment.

Figure 2:
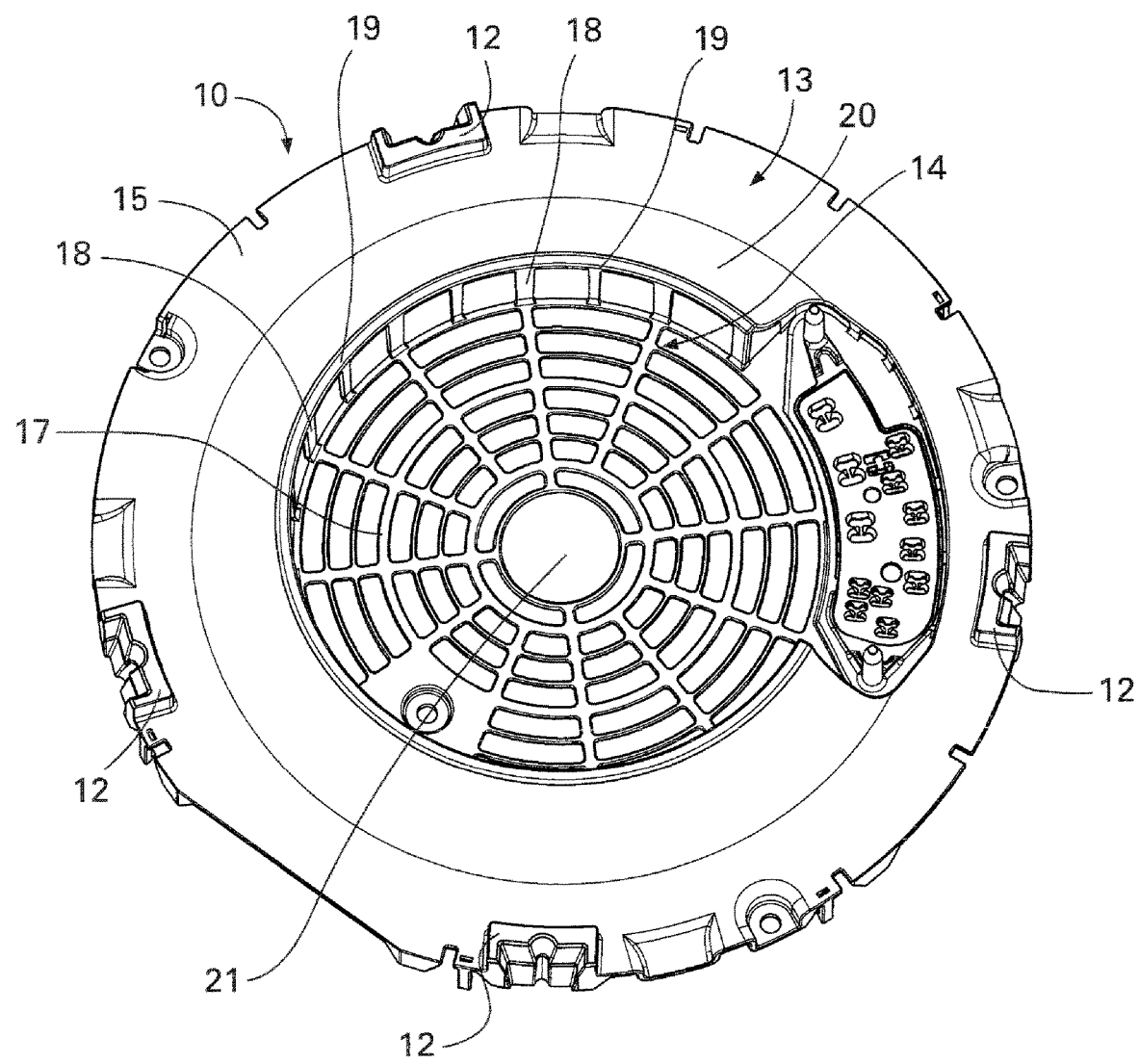
FIG. 2 is a front view of a cover plate, according to the invention, acting as contact-protection.
Figure 3:
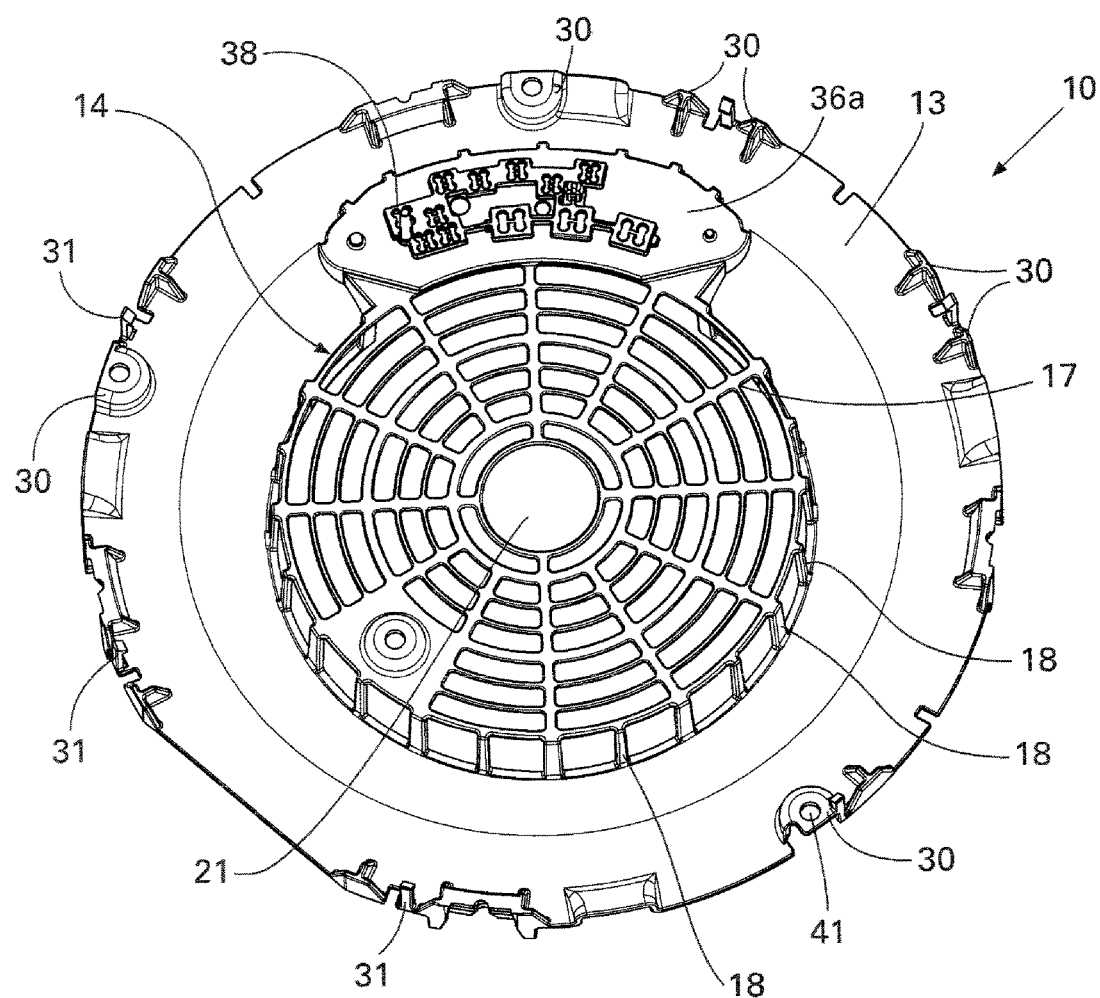
FIG. 3 is a rear view of the cover plate according to FIG. 2.
Figure 4:
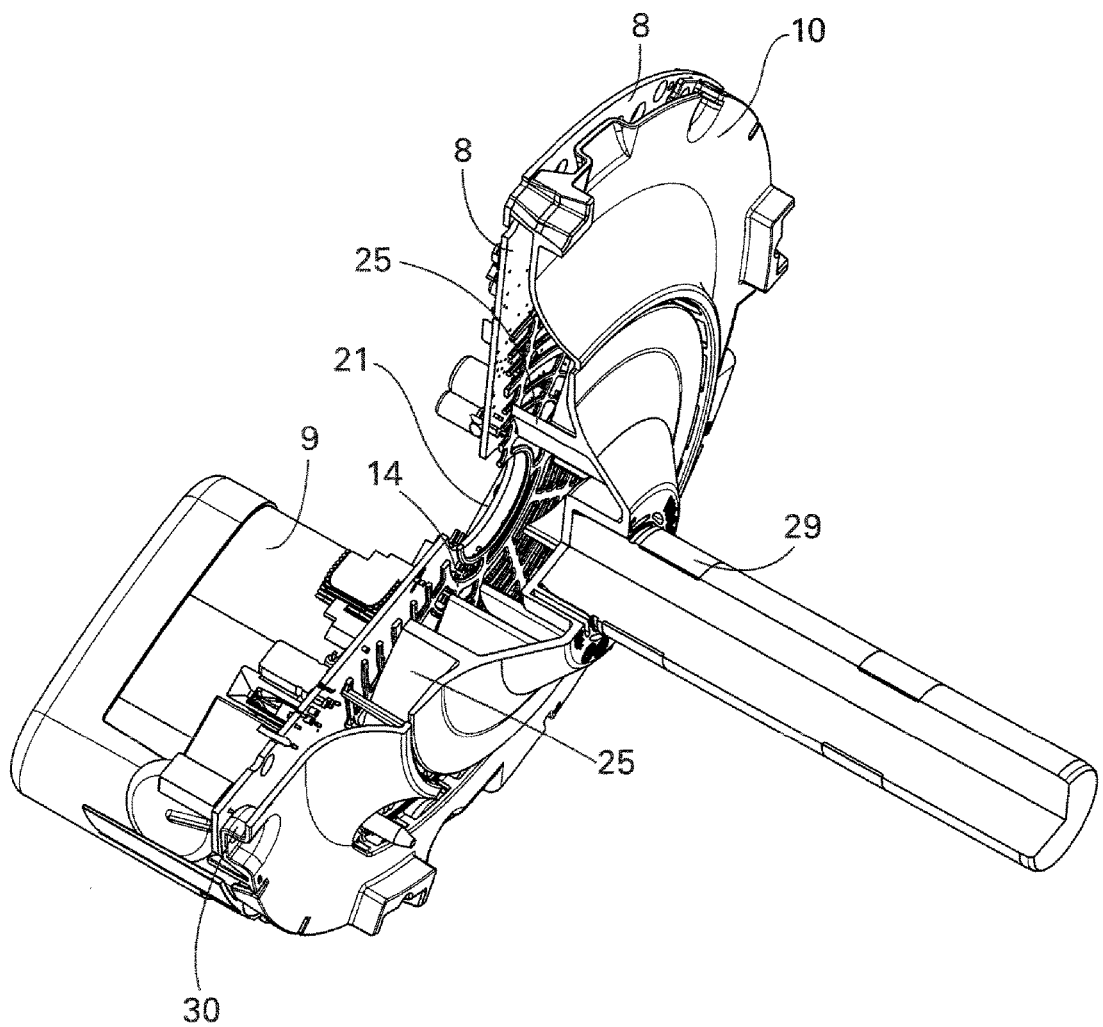
FIG. 4 is a perspective view of a contract-protection cover plate, according to the invention, according to FIG. 2 when assembled on an electronic printed circuit board, with a fan wheel of an internal fan of an electric motor.

As can be seen in FIGS. 1 and 3, an electronics housing 1 according to the invention consists of a housing receiving part 2 comprising a housing floor 3, a housing wall 4 incorporating said housing floor, and a housing opening 5 opposite the housing floor 3. A motor electronics component 7 having an electronic printed circuit board 8 and a motor control unit 9 is arranged in the housing receiving part 2. The electronic printed circuit board 8 is expediently arranged so as to be inwardly offset in the direction of the housing floor 3 from the housing opening 5. The housing opening 5 is sealed by means of a contact-protection cover plate 10 which forms a contact-protection element for the electronic printed circuit board 8. The contact-protection cover plate 10 is produced in particular as a plastics injection-moulded part from an electrically insulated material. The contact-protection cover plate 10 has an outer contour which is expediently adapted to an inner contour of the housing opening 5, so that the contact-protection cover plate 10 can be fitted into the housing opening 5. The contact-protection cover plate 10 has guide rails 12 at its circumferential edge, which are used for connection to the stator flange 42 (see FIG. 7). In the embodiment shown, the contact-protection cover plate 10 according to the invention has an outer circumferential ring part 13 and an inner grille part 14. The ring part 13 has a continuously closed planar wall 15 and is used to fasten the contact-protection cover plate 10 to the electronic printed circuit board 8 or to the motor electronics component 7. Such a fastening can be carried out by means of screws 16 and/or latching hooks 31, for example. The grille part 14 consists of a planar floor portion 17, which is arranged so as to be offset in the direction of the housing floor 3 from the wall 15 of the ring part 13 in the assembled state of the contact-protection part or contact-protection cover plate 10. At its outer edge, the floor portion 17 is connected to the ring part 13 by means of individual connecting webs 18 extending perpendicularly to the floor portion 17. The connecting webs 18 project beyond the wall 15 via their ends 19 opposite the floor portion 17, such that the wall 15 is connected to the ends 19 over an in particular concavely formed transition portion 20. Furthermore, the floor portion 17 has a central, preferably circular, opening 21. As can be seen in FIGS. 2, 3 and 4 in particular, the grille part 14 is sized to receive a fan wheel 25. The fan wheel 25 is a component of an internal fan of an electric motor 28 (see FIG. 7) and is driven by a motor shaft 29 of the electric motor 28.

In this process, the fan wheel 25 dips into the grille part 14, so that air located between the fan wheel 25 and the electronic printed circuit board 8 circulates, thus achieving an improved cooling effect. Furthermore, it can be seen in FIG. 3 that the ring part 13 has spacers 30 on its side facing the housing floor 3, via which the contact-protection cover plate 10 bears on the electronic printed circuit board 8. The spacers 30 are sized such that the grille part 14 is not in contact with the electronic printed circuit board 8 in the assembled state.

It is also within the scope of the present invention for the ring part 13 to not have a closed wall 15 over its entire circumference; in fact, this wall 15 may also be in the form of a grille in part.

Furthermore, it can be seen in FIG. 3 in particular that latching hooks 31 can be formed on the circumferential edge of the ring part 13 and be used to fasten the contact-protection cover plate 10 to the electronic printed circuit board 8 in a latching manner.

FIG. 4 shows how the contact-protection cover plate 10 according to the invention is connected to the electronic printed circuit board 8 and how the fan wheel 25 dips into the receiving chamber formed by the grille part 14. In this arrangement, the airflow can flow into the fan wheel 25 via the central opening 21 and is blown radially outwardly out of said fan wheel through the lateral openings in the grille part 14, which are defined by the webs 18.

Figure 5:
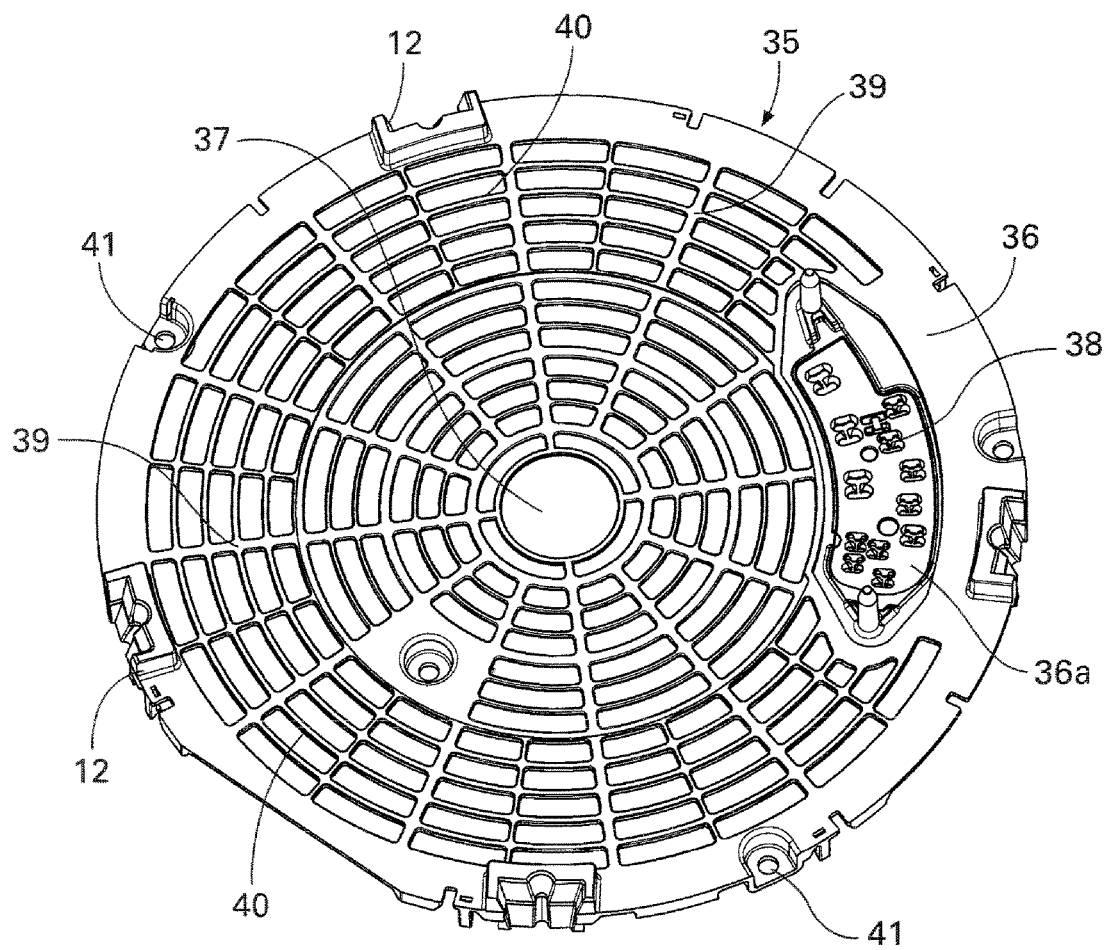
FIG. 5 is a front view of an alternative embodiment of a contact-protection cover plate according to the invention.
Figure 6:
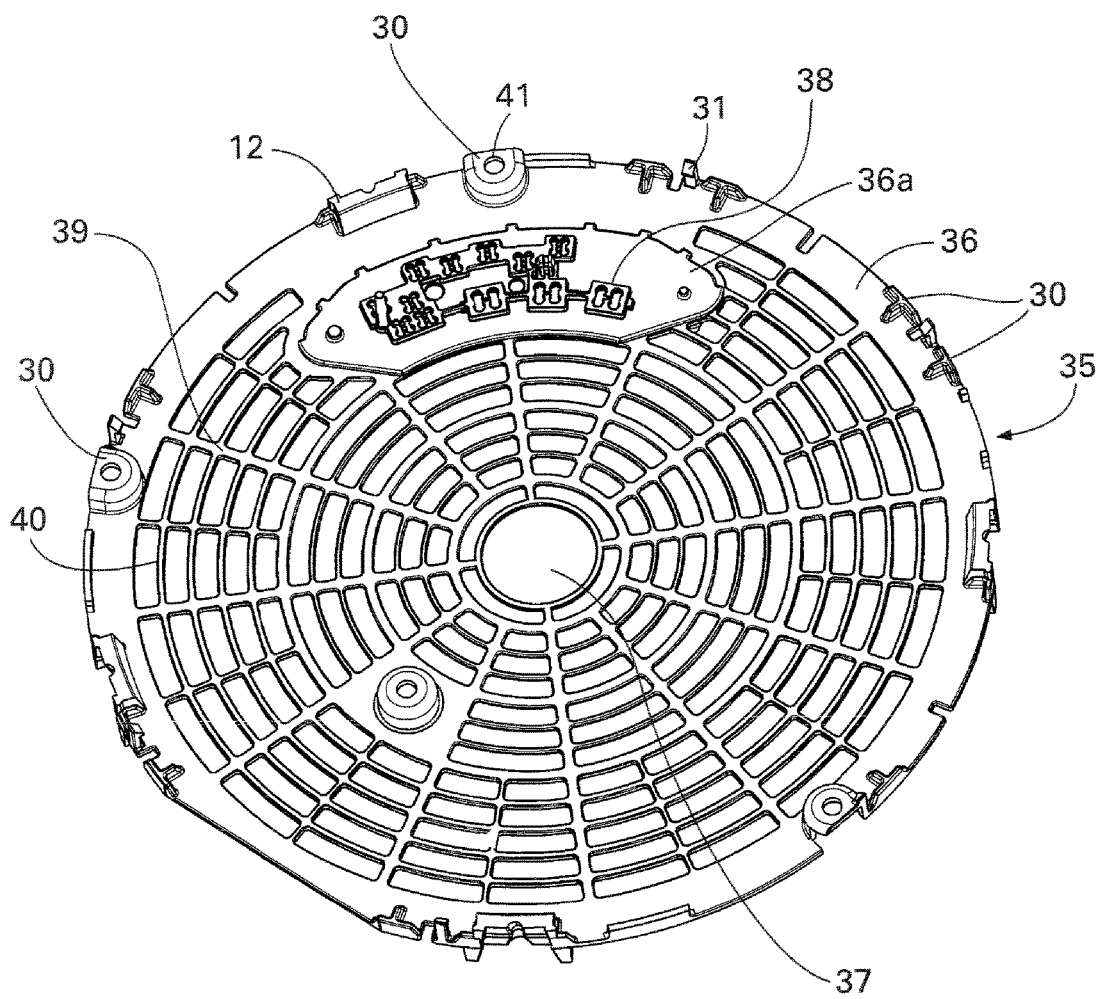
FIG. 6 is a rear view of the contact-protection cover plate according to FIG. 5.

FIGS. 5 and 6 show an alternative configuration of a contact-protection component according to the invention or of a contact-protection cover plate 10. This cover plate 35 has a wall 36 which is substantially formed over its entire surface as a grille structure. In this case the wall 36 has a central opening 37, from the edge of which radial grille webs 39 extend as far as the circumferential edge of the cover plate 35. The individual grille webs 39 are interconnected by circumferentially extending web-like struts 40. The above-described spacer, fastening and guide elements are formed on the circumferential edge of the cover plate 35. As in the above-described embodiment, holes 41 are again provided in the spacers 30, through which holes the fastening screws can be inserted.

Furthermore, the cover plate 35 has a closed wall portion 36a, in which joining aids 38 are formed for through-contacting of electrical contacts of the motor electronics, which contacts are used for electrical connection of the motor electronics to a drive part of the electric motor. The contact-protection cover plate 10 according to the embodiment in FIGS. 2 and 3 likewise has a corresponding closed wall portion 36a.

Figure 7:
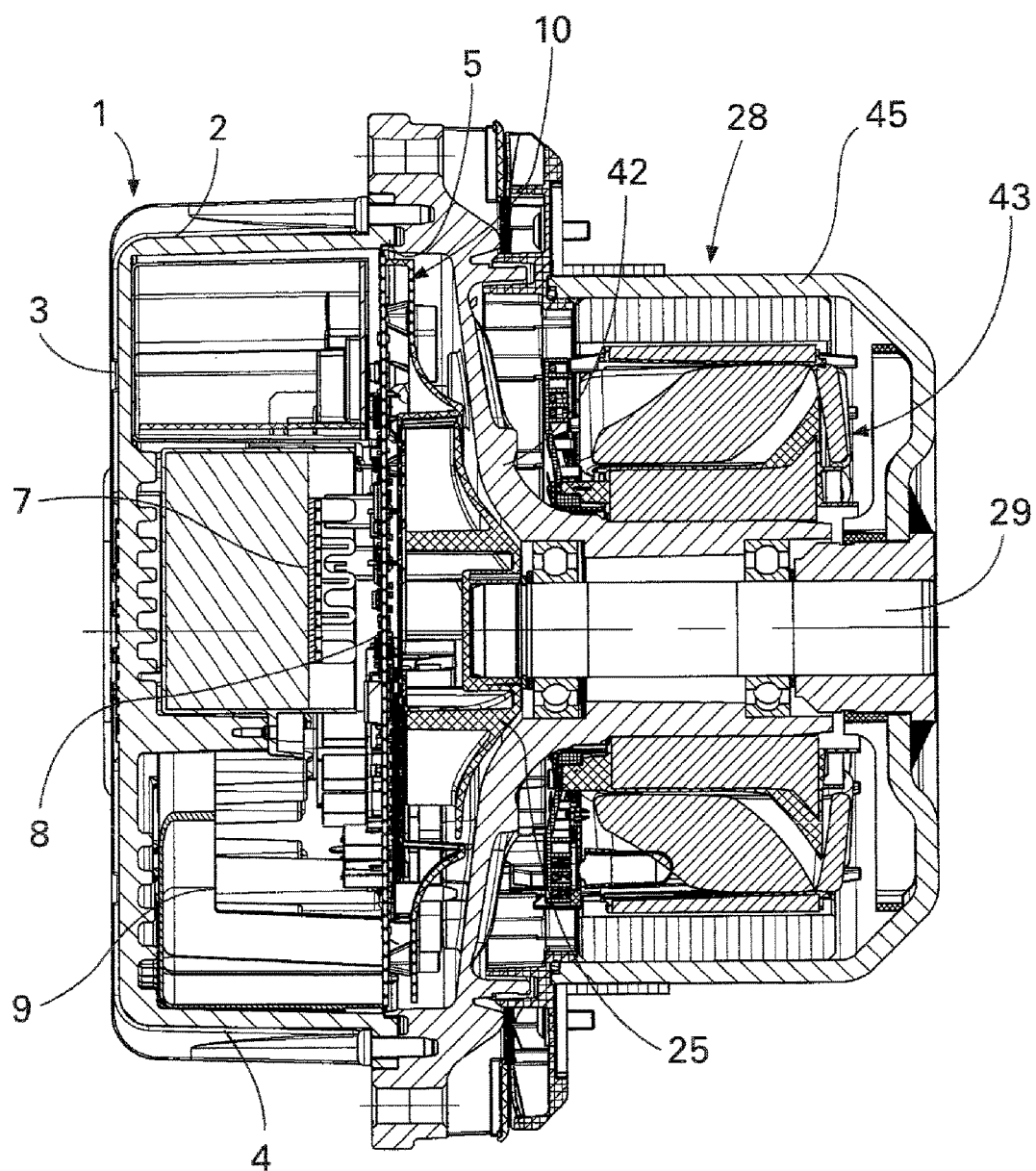
FIG. 7 is a section through an electric motor using an electronics housing according to FIG. 1.

As can be seen from FIG. 7, the electronics housing 1 according to the invention is for example screwed onto a stator flange 42 of a stator 43 of the electric motor 28. The stator 43 has a stator tube portion in which a motor shaft 29 is mounted, to the end of which motor shaft a pot-shaped rotor 45 of an external rotor motor is fastened. As visible in FIG. 7, the fan wheel 25 of the internal fan is arranged between the stator 43 and the contact-protection cover plate 10 according to the invention. To facilitate assembly of the electronics housing 1, the stator flange 42 has a plurality of guide pins (not shown) at its circumferential edge, which extend from the circumferential edge of the stator flange in the direction of the electronics housing 1 or of the contact-protection cover plate 10. In conjunction with the guide rails 12 of the contact-protection cover plate 10, these guide pins are intended to facilitate assembly of the full electronics housing 1. Alternatively, the guide pins can be formed on the contact-protection cover plate 10 and the guide rails 12 can be formed on the stator flange 42.

According to the invention, the contact-protection cover plates 10, 35 are in the region of the housing opening 5 and seal the electronics housing 1 from the stator 43 in the region of the electric motor. In this arrangement, the contact-protection cover plates 10, 35 do not act as conveyors but are used for contact protection. The guide rails 12 in the outer region facilitate the joining process, since during assembly these guide rails 12 advantageously preliminarily engage with the guide pins of the stator flange 42, thereby precentring the whole control unit in the electronics housing 1. Owing to the arrangement of the guide rails 12 here, the control unit can only be fixed in one position. After precentring, the joining aid 38 integrated in the cover plate comes into engagement, for the purpose of positioned contacting of the electrical connection between the electronics and the stator 43. The contact-protection cover plate 10, 35 according to the invention is fastened either by means of latching hooks 31 in the electronic printed circuit board 8 and/or by being screwed together with the electronic printed circuit board 8 to the electronics housing 1.

The embodiment according to FIGS. 5 and 6, in which the cover plate 35 is constructed as a planar contact protection element, is advantageous if there is too little space below the electronic printed circuit board, between this and the stator flange, to accommodate a recessed cover plate.

The invention is not limited to the embodiments that have been shown and described but also covers all equivalent designs within the meaning of the invention. Furthermore, the invention has also not yet been limited to the combination of features which is defined in claim 1, but may also be defined by any given alternative combination of particular features from among all the individual features disclosed as a whole. This means that in principle virtually any individual feature of claim 1 can be omitted or replaced by at least one individual feature disclosed elsewhere in the application. In this respect, claim 1 should be construed merely as a first attempt at setting out an invention.

The invention claimed is:

1. An electronics housing for an electric motor, consisting of a housing receiving part comprising a housing floor, a housing wall incorporating the housing floor, and comprising a housing opening opposite the housing floor, a motor electronics component comprising an electronics printed circuit board being arranged in the housing receiving part, which electronics printed circuit board extends parallel to the opening plane of the housing opening, wherein a contact-protection component made of an electrically insulating material and covering the surface of the electronic printed circuit board is removably arranged on the electronic printed circuit board or on the motor electronics component on the side of the electronic printed circuit board facing away from the housing floor, at least part of which contact-protection component has a grille structure as ventilation, wherein
the contact-protection component is formed as a cover plate used to seal the housing opening, the cover plate having an outer contour which is adapted to an inner contour of the housing opening.

2. The electronics housing according to claim 1, wherein the cover plate has an outer circumferential ring part and an inner grille part.

3. The electronics housing according to claim 2, wherein the ring part has a continuously closed planar wall, and the grille part consists of a planar floor portion which is arranged so as to be offset in the direction of the housing floor from the wall of the ring part in the assembled state of the cover plate, and the floor portion is connected at its outer edge to the ring part by means of individual connecting webs extending perpendicularly to the floor portion.

4. The electronics housing according to claim 3, wherein the connecting webs project beyond the wall via their ends opposite the floor portion, such that the wall is connected to the ends over an in particular concavely formed transition portion.

5. The electronics housing according to claim 3, wherein the floor portion has a central, preferably circular, opening, and the grille part is sized to receive a fan wheel, which is a component of an internal fan of an electric motor and is driven by a motor shaft of the electric motor, the fan wheel dipping into the grille part, so that air located between the fan wheel and the electronic printed circuit board circulates.

6. The electronics housing according to claim 1, wherein the contact-protection component consists of a cover plate comprising a wall formed over its entire surface as a grille structure, the wall having a central opening, from the edge of which radial grille webs extend as far as the circumferential edge of the cover plate, and the individual grille webs being interconnected by circumferentially extending web-like struts.

7. The electronics housing according to claim 2, wherein either the ring part or the circumferential edge of the cover plate has spacers on its side facing the housing floor, via which spacers the cover plate bears on the electronic printed circuit board.

8. The electronics housing according to claim 2, wherein the ring part has a closed wall over its entire circumference or this wall is also in the form of a grille in part.

9. The electronics housing according to any of claim 2, wherein latching hooks are formed on the circumferential edge of the ring part or of the cover plate and used to fasten the cover plate to the electronic printed circuit board in a latching manner.

10. The electronics housing according to claim 1, wherein the cover plate and the cover plate have a closed wall portion in which joining aids are formed for through-contacting of electrical contacts of the motor electronics.

11. The electronics housing according to claim 1, wherein the contact-protection cover plate has guide means at its circumferential edge, which cooperate with guide means on a stator flange of a stator of an electric motor during assembly of the electronics housing.

* * * * *